US010347055B2

(12) United States Patent
Hathaway et al.

(10) Patent No.: US 10,347,055 B2
(45) Date of Patent: Jul. 9, 2019

(54) METHOD AND APPARATUS FOR CONNECTING TO A HEAVY DUTY VEHICLE AND PERFORMING A VEHICLE ROADWORTHINESS CHECK

(71) Applicant: NOREGON SYSTEMS, INC., Greensboro, NC (US)

(72) Inventors: Bill Hathaway, Greensboro, NC (US); Dave Covington, King, NC (US); Lee Lackey, Clemmons, NC (US)

(73) Assignee: NOREGON SYSTEMS, INC., Greensboro, NC (US)

( * ) Notice: Subject to any disclaimer, the term of this patent is extended or adjusted under 35 U.S.C. 154(b) by 0 days.

(21) Appl. No.: 15/278,666

(22) Filed: Sep. 28, 2016

(65) Prior Publication Data
US 2017/0092020 A1 Mar. 30, 2017

Related U.S. Application Data

(60) Provisional application No. 62/233,633, filed on Sep. 28, 2015.

(51) Int. Cl.
*G07C 5/08* (2006.01)
*G07C 5/00* (2006.01)
*G06Q 30/02* (2012.01)

(52) U.S. Cl.
CPC ......... *G07C 5/008* (2013.01); *G06Q 30/0265* (2013.01); *G07C 5/0808* (2013.01)

(58) Field of Classification Search
CPC ...... G07C 5/008; G07C 5/0808; G06Q 10/08; G06Q 30/0265; G06Q 50/30
See application file for complete search history.

(56) References Cited

U.S. PATENT DOCUMENTS

| | | | | |
|---|---|---|---|---|
| 6,957,133 B1* | 10/2005 | Hunt | ...................... | B60R 25/102 701/32.4 |
| 7,225,065 B1* | 5/2007 | Hunt | ................... | B60R 16/0207 701/33.2 |
| 8,560,161 B1* | 10/2013 | Kator | ................... | G06Q 10/087 701/29.6 |
| 9,520,006 B1* | 12/2016 | Sankovsky | ............ | G07C 5/006 |
| 9,672,665 B1* | 6/2017 | Kraft | ...................... | G07C 5/006 |

(Continued)

OTHER PUBLICATIONS

Changin' gears, "Truck classification" web page, accesses Nov. 27, 2017, 2 pages, downloaded from: http://changingears.com/rv-sec-tow-vehicles-classes.shtml (Year: 2017).*

(Continued)

*Primary Examiner* — Behrang Badii
*Assistant Examiner* — David A Testardi
(74) *Attorney, Agent, or Firm* — Oliff PLC; R. Brian Drozd

(57) ABSTRACT

A vehicle roadworthiness assessment system may include a diagnostic apparatus for performing diagnostics on a vehicle, where the diagnostic apparatus is configured to connect to and request a status of components of the vehicle; a processor to determine a diagnostic assessment for each vehicle based on the diagnostics; a monitoring station connected to the diagnostic apparatus to receive the diagnostic assessment and score for each vehicle where the diagnostics were performed; and storage connected to the diagnostic apparatus and configured to store data of the diagnostic assessment.

20 Claims, 5 Drawing Sheets

(56) References Cited

U.S. PATENT DOCUMENTS

| | | | | |
|---|---|---|---|---|
| 9,984,511 B1* | 5/2018 | Sankovsky | | G07C 5/006 |
| 2002/0193925 A1* | 12/2002 | Funkhouser | | G07C 5/0808 701/31.8 |
| 2003/0055666 A1* | 3/2003 | Roddy | | B61L 27/0094 705/305 |
| 2003/0231118 A1* | 12/2003 | Kitson | | H04Q 9/02 340/870.07 |
| 2004/0167689 A1* | 8/2004 | Bromley | | G07C 5/008 701/29.6 |
| 2005/0060070 A1* | 3/2005 | Kapolka | | G06Q 10/08 701/31.4 |
| 2005/0065678 A1* | 3/2005 | Smith | | G06Q 10/00 701/31.4 |
| 2005/0182537 A1* | 8/2005 | Tefft | | G07F 17/0014 701/29.6 |
| 2005/0234616 A1* | 10/2005 | Oliver | | G07C 5/008 701/31.4 |
| 2007/0083306 A1* | 4/2007 | Comeau | | G07C 5/008 701/29.6 |
| 2009/0006476 A1* | 1/2009 | Andreasen | | G06Q 50/30 |
| 2009/0299900 A1* | 12/2009 | Chen | | G06Q 20/102 705/40 |
| 2010/0017167 A1* | 1/2010 | Duc | | G05B 23/0251 702/185 |
| 2010/0204876 A1* | 8/2010 | Comeau | | G07C 5/008 701/29.6 |
| 2012/0053778 A1* | 3/2012 | Colvin | | G07C 5/008 701/29.4 |
| 2012/0136802 A1* | 5/2012 | McQuade | | G06Q 30/0282 705/347 |
| 2012/0194679 A1* | 8/2012 | Nehowig | | G06F 1/1626 348/148 |
| 2013/0158777 A1* | 6/2013 | Brauer | | G06Q 10/20 701/31.4 |
| 2013/0242097 A1* | 9/2013 | Cardoso | | G01N 25/72 348/148 |
| 2013/0246135 A1* | 9/2013 | Wang | | G07C 5/008 705/14.4 |
| 2014/0011483 A1* | 1/2014 | Baumert | | G07C 5/008 455/414.1 |
| 2014/0193018 A1* | 7/2014 | Lim | | H04M 1/026 381/334 |
| 2015/0094905 A1* | 4/2015 | Frashure | | G07C 5/06 701/33.2 |
| 2015/0105972 A1* | 4/2015 | Madison | | G07C 5/085 701/33.2 |
| 2015/0269788 A1* | 9/2015 | Elliott | | G07C 5/008 701/31.5 |
| 2016/0052470 A1* | 2/2016 | Shore | | B60R 16/0234 701/29.1 |
| 2016/0062356 A1* | 3/2016 | Worden | | G05D 1/0027 701/2 |
| 2016/0063418 A1* | 3/2016 | Roddy | | G06Q 10/06315 705/7.25 |
| 2016/0247109 A1* | 8/2016 | Scicluna | | G06Q 10/06315 |

OTHER PUBLICATIONS

Ladd Distribution Catalog, "TE Connectivity's Industrial & Commercial Transportation Products", Controller Area Networks, Copyright 2014, pages 91 to 95 (Year: 2014).*

Wikipedia article, "On-board diagnostics", Old revision dated Sep. 1, 2015, 15 pages (Year: 2015).*

Wikipedia article, "Truck classification", Old revision dates Sep. 24, 2015, 7 pages (Year: 2015).*

* cited by examiner

METHOD AND APPARATUS FOR CONNECTING TO A HEAVY DUTY VEHICLE AND PERFORMING A VEHICLE ROADWORTHINESS CHECK

CROSS-REFERENCE TO RELATED APPLICATIONS

This application claims the benefit of priority of U.S. Provisional Patent Application No. 62/233,633, filed on Sep. 28, 2015, the entire contents of which are incorporated by reference herein.

BACKGROUND

With the emissions regulatory changes of 2004, 2007, 2010 and eventually 2014, heavy duty trucks have been become increasing complex in terms of information lamps, indicator lights and the number and types of components installed on the vehicle. In addition the Comprehensive Safety Assessment (CSA) established in 2010 by the Federal Motor Carrier Safety Administration (FMSCA) is a tool used by the FMSCA to find and shut down truck fleets. One of the major components for making this determination is vehicle maintenance, which is impacted by vehicle issues "which would hinder safe operation of the vehicle". Given these two forces, fleets and owner operators are increasingly challenged to determine whether the vehicles they use every day are CSA compliant (roadworthy) and ready to generate revenue by performing their deliveries. Fleets have been further hampered by record driver turnover causing issues when new drivers are unfamiliar with their vehicles. Some concerns are whether a flashing lamp on the dash means that the truck is in imminent danger of shutting down and causing a missed delivery and whether such issues can be easily corrected or be deferred until the vehicle's mission is over or the next maintenance interval comes up.

BRIEF SUMMARY

To address the above concerns and issues of vehicle roadworthiness, embodiments disclosed involves hardware and software platforms for determining the roadworthiness of a heavy duty vehicle and/or its trailer. Vehicle roadworthiness may be an objective assessment of the vehicle's capability to perform its mission arrived at via interrogation of the vehicle's electronic control units (ECUs) through the vehicle's data-buses. The platform may have a small footprint and is easily deployed and integrated with any site where heavy trucks are in use.

In one embodiment, the roadworthiness of a heavy duty vehicle, such as a truck, is performed. The roadworthiness may be an objective assessment of the vehicle and its components readiness to perform. The assessment is arrived at via interrogation of the vehicle's components through the vehicle's data networks. The platform is comprised of an apparatus to connect to the vehicle and a central monitoring station to report the results. To perform a roadworthiness check, the vehicle is connected to the apparatus via a cable or wireless connection. The apparatus reads the vehicle and component's state information and sends it to the central monitoring station where it is analyzed and a report outputted. The output contains the vehicle's roadworthiness assessment. The central monitoring station can also send the roadworthiness assessment electronically (email/text). The monitoring station is connected to a server and all vehicle connections may be uploaded thereto.

A vehicle roadworthiness assessment system may include a diagnostic apparatus for performing diagnostics on a vehicle, where the diagnostic apparatus is configured to connect to and request a status of components of the vehicle; a processor to determine a diagnostic assessment for each vehicle based on the diagnostics; a monitoring station connected to the diagnostic apparatus to receive the diagnostic assessment and score for each vehicle where the diagnostics were performed; and storage connected to the diagnostic apparatus and configured to store data of the diagnostic assessment.

BRIEF DESCRIPTION OF THE DRAWINGS

For clarity, the drawings in this document are not necessarily to scale, and are provided to illuminate the concepts of the subject matter, but not to limit the invention.

DETAILED DESCRIPTION

Figure 1:
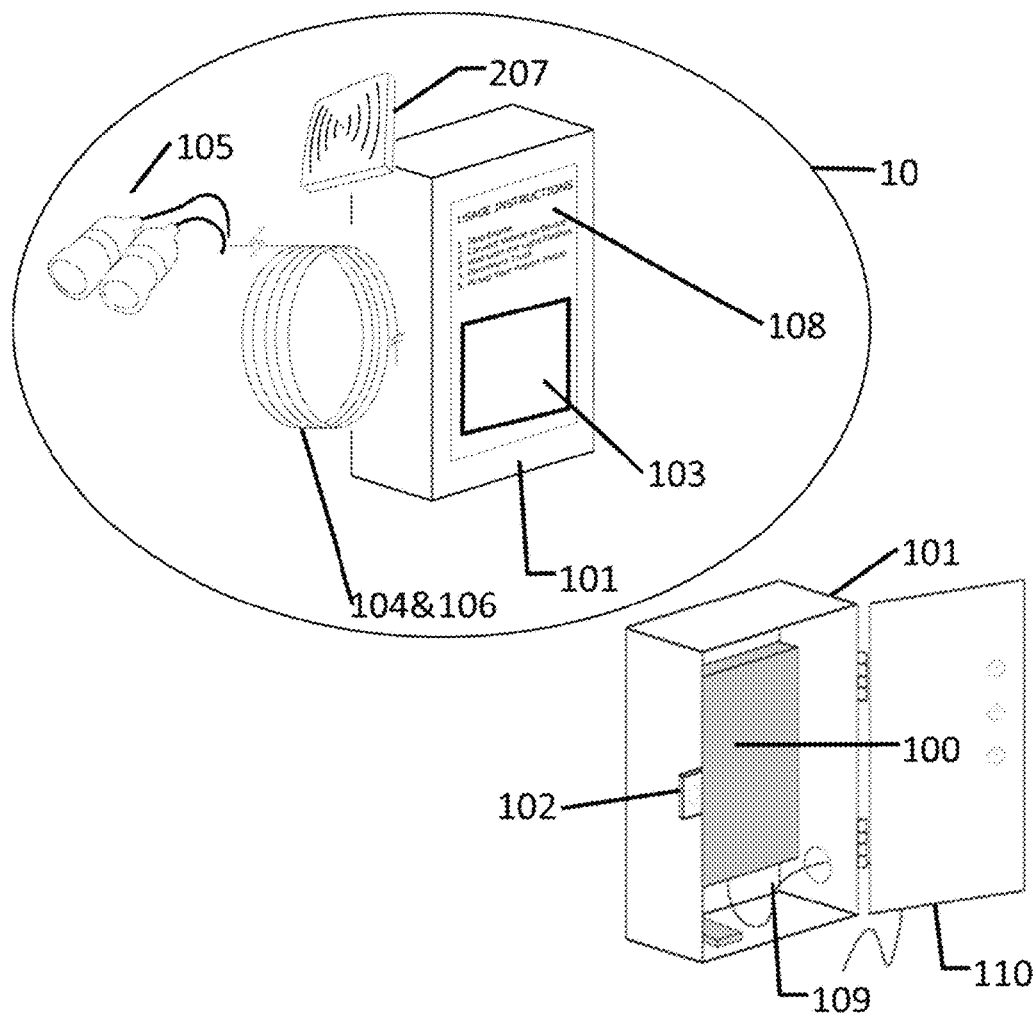
FIG. 1 shows a perspective view of an exemplary configuration of the self-service apparatus and its enclosure for reading data from the heavy duty vehicle, according to one or more embodiments.

According to an embodiment, a vehicle roadworthiness assessment system may include:
1) a plurality of on-site devices for connecting and reading the vehicle's state referred to herein as "TruckCheckUp Stations";
2) an on-site monitoring station operated by an attendant for providing the vehicle's roadworthiness assessment to the customer;
3) a system (or attendant) for collecting payment for the roadworthiness assessment; and/or
4) a network-based storage site where roadworthiness assessments may be uploaded/stored.

The self-service apparatus may read data from any vehicle equipped with a heavy duty vehicle data bus connector and access the status of its associated components. This apparatus shall be comprised of any of the following components:
1) an enclosure houses all components of the apparatus and provides them with environmental protection. The exterior of the enclosure can be used to display instructions or provide ad space. The enclosure can be mounted on any new or existing support structure that provides easy access to a heavy duty vehicle and its trailer.
2) The computational capability of the apparatus may be provided by a personal computer or other computational device containing a micro-controller or microprocessor that resides in the enclosure.
    A) The computational device contains sufficient memory and storage to perform its task.

B) The computational device may control all user input/output devices, network control devices and adapter for interface to the vehicle.

C) The computational device may provide a means for communicating with the customer (e.g., vehicle owner, vehicle driver, third party, etc.), including but not limited to a touch screen, standard LCD, Plasma, CRT or LED display, LED Lamps, sound alerts or recorded voice instructions. These devices would be mounted on, in or near the enclosure.

D) The computational device may integrate with a network interface including, but not limited to wired or wireless LAN, WAN, CAN or LON based network utilizing Ethernet, ISDN, Zigbee, 802.11, Cable Broadband, or DSL The network interface provides communication services between the apparatus and the central monitoring station.

E) The device may include an external wireless antenna to facilitate wireless network communications between the computing device within the enclosure and the central monitoring station.

F) The device includes sensors for determining various operating conditions including, but not limited to customer proximity, vehicle proximity, humidity and enclosure interior and exterior temperature.

The enclosure also contains an interface device (adapter) that connects to the computational device and provides connectivity and communication with a heavy duty vehicle. The adapter captures and records raw data from the vehicle's databuses. The adapter sends the raw data back to computing device. The computing device directly stores the collected raw vehicle data (vehicle log) on the central monitoring station via a network connection.

External to the enclosure is a vehicle connector cable. The cable is designed to reach from the apparatus/enclosure to the location of where the cable will be attached to the vehicle, such as at the driver's side of the vehicle. The cable is flexible, so it can be routed over and around any obstacles. The cable may have one or more connection heads including, but not limited to: SAE J1939-13 6 pin Deutsch connector for vehicles prior to 2007, an SAE J1939-13 9 pin Deutsch connector for vehicles from 2007 to present and/or an SAE J1962 connector for 2013 and newer trucks. The cable can be coiled back onto a holder on the enclosure or may be on a retractable reel.

A central monitoring station at each site receives vehicle data from each apparatus and can analyze vehicle data and make a roadworthiness assessment. This station may include:

a personal computer or other computational device containing a micro-controller or micro-processor with memory and storage designed to control all user input devices and network control devices;

a device that can be driven via external input devices including, but not limited to keyboard, mouse or touchscreen;

devices for communicating with the attendant, including, but not limited to touch screen; standard LCD, Plasma, CRT or LED display;

a network interface that may include, but not limited to wired or wireless LAN, WAN, CAN or LON based network utilizing Ethernet, ISDN, Zigbee, 802.11, Cable Broadband, or DSL; and a printer for providing a roadworthiness assessment report.

The central monitoring station may show all past vehicle connections at a site, with the newest connections being shown first. Each vehicle connection will show relevant vehicle identification information including but not limited to VIN, Vehicle Make and Model year. Each connection will be time-stamped to assist attendant in picking the correct connection. The site attendant can choose a vehicle connection and print the roadworthiness assessment associated with that connection.

The central monitoring station may have a network interface between it and all apparatuses at the site. The central monitoring station may have a network interface between it and an external data storage site/server, such as a "TruckCheckUp server." The network interface between the station and apparatus may be different from the network interface between the station and an external data storage site/server to provide an additional level of device security.

The report generated by Central Monitoring Station may include, but is not limited to the following elements: logo, date and time stamp, site barcode, vehicle make and related info, recommended action (overall roadworthiness assessment), assessment of issues with essential vehicle components (engine, transmission, brakes, emissions, etc. . . . ), number of active and inactive faults, fault code details (such as, but not limited to fault description, fault state, effect on vehicle, recommended action, lookup code, FMI and count), consumable fluids status, emissions status, vehicle data, vehicle configuration data, current recall and service campaigns, upcoming major maintenance activities, and locations of nearby repair facilities.

Roadworthiness assessment is based on the collected vehicle data for each component, a severity level for all problems found. Severity level indicates the likelihood of mechanical/electrical failure and whether it is safe to continue operating the vehicle and for how long. The report can be sent to third parties such as user, owner, company or vehicle service shop using, but not limited to: email or text message.

The above description is a broad overview of some exemplary embodiments. More details and additional/alternative embodiments are discussed below.

Embodiments of the present disclosure relate to a method and apparatus for providing a roadworthiness assessment of a heavy duty vehicle with a connected trailer(s). As shown in FIG. 1, the Truck Check Up station is referred to by the numeral 10. This Truck Check Up station may be installed at a location such as a gas station or the like for a truck to access.

The Truck Check Up station is first discussed relative to the composition and relationships of elements to each other according to some embodiments. For example, in one embodiment shown in FIG. 1, the Truck Check Up station 10 is made up of a self-service apparatus 100 which resides inside an enclosure 101 to provide environmental protection to the apparatus 100. The enclosure 101 may have an access door 110 that could be locked 102 to protect against tampering. The access door may allow service personnel to access any components within the enclosure 101. The enclosure 101 can be mounted/integrated with any existing structure at a vendor's site.

Supporting the apparatus 100 may be usage instructions 108 mounted on the enclosure 101 or in the vicinity of the enclosure. The enclosure 101 may also have status indicators 103 that may provide the user with guidance during the connection process. Optionally there could be a proximity sensor 107 mounted on or in the enclosure 101 that may be connected to the internal computing device 301 and provide indication of when a vehicle or person has approached.

A cable reel 106 may be mounted on or around the enclosure. The cable reel 106 may be connected to the enclosure 101 by a fixed cable 109. The cable reel 106 may house the retractable cable 104. The retractable cable 104 allows a vehicle connection to be made anywhere close to the enclosure 101. At the end of the retractable cable 104 is the vehicle connector 105. Optionally a wireless vehicle connector 105 could be used to make the connection between the enclosure and vehicle instead of using a cable, according to some embodiments.

Figure 2:
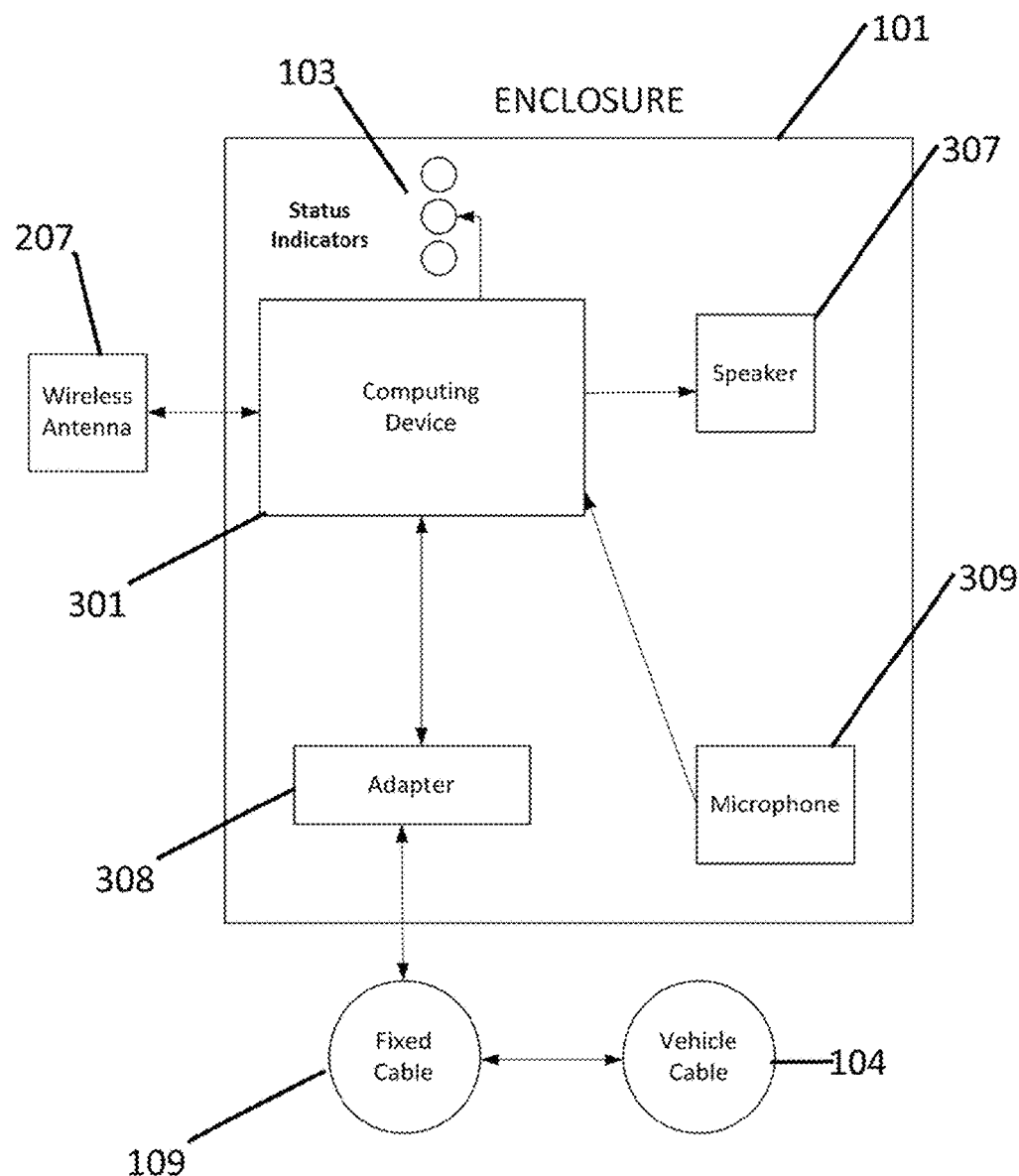
FIG. 2 illustrates a block diagram illustrating one example of a computing device for use in the self-service apparatus and enclosure, according to one or more embodiments.

FIG. 2 illustrates the contents of the self-service apparatus 100, according to some embodiments. The self-service apparatus 100 may be a computing device 301 with sufficient memory and processing power to be able to handle and store SAE J1939 and SAE J1587 databus traffic. The computing device 301 controls status indicators 103. The user is updated on the status of the vehicle assessment through the status indicators 103. The computing device 301 can also integrate with a speaker 307 that would be built into the apparatus enclosure 101. The speaker 307 could provide auditory prompts, directions, help or ads to the user.

Vehicle communication could be facilitated by one of two methods. One method would be for the computing device 301 to have vehicle interfaces integrated into its architecture. The second method would be to integrate a vehicle interface device (adapter) 308 with the computing device 301 via USB, Ethernet or other common computer based interface. In either case the solution would have to be connected to the fixed cable 109 that connects to the cable reel 106 outside the apparatus enclosure 101.

The computing device 301 would use a network (wireless or wired) to transfer raw data between the apparatus 100 and the central monitoring computing device 501. To assist in this transfer, the computing device 301 could use an external wireless antenna 207. For smaller distances the wireless antenna 207 can reside in the apparatus enclosure 101. For longer distances, the wireless antenna 207 could be disposed outside of the apparatus enclosure 101 to an external mounting spot.

Figure 3:
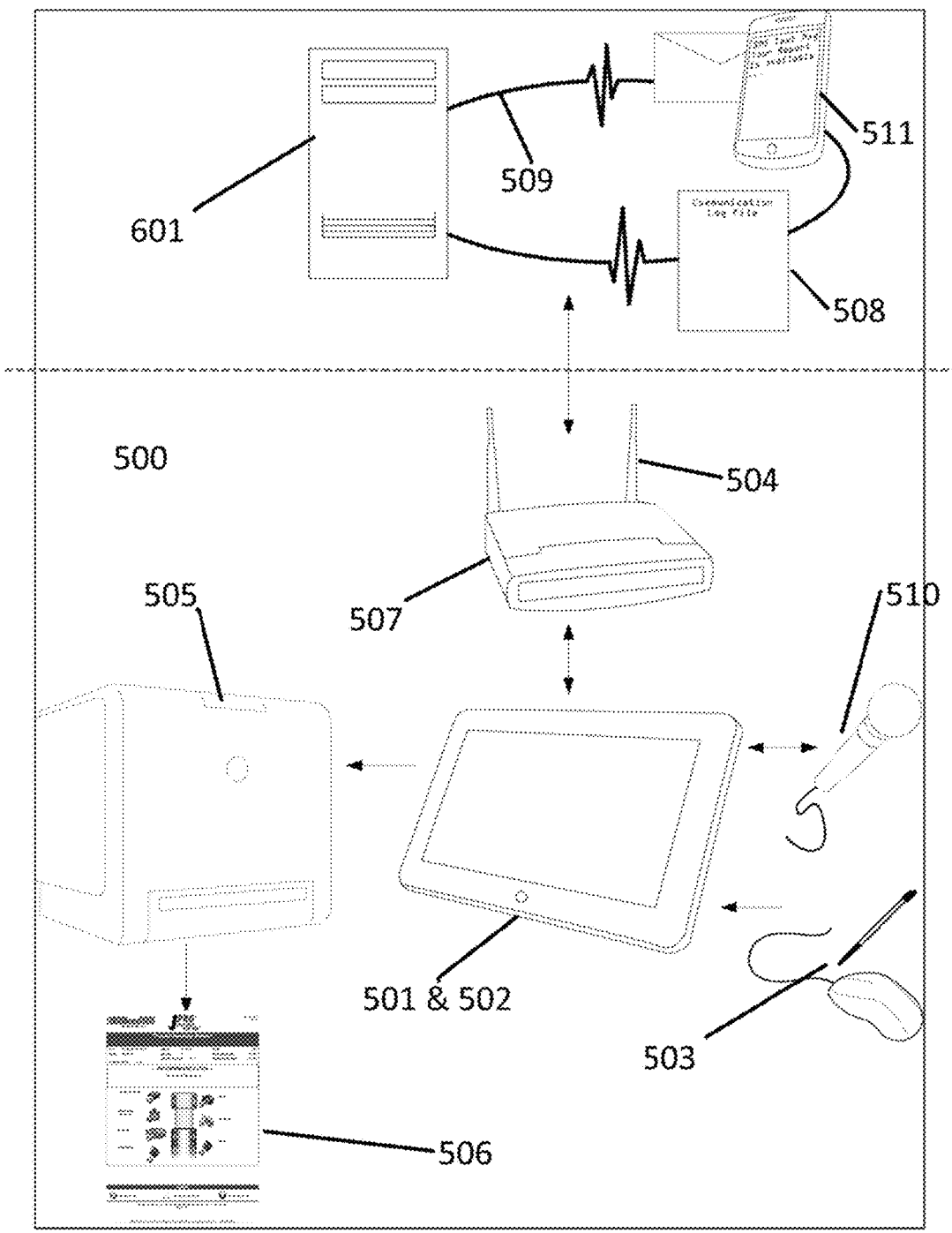
FIG. 3 presents a perspective view of the central monitoring station in the vendor's establishment, according to one or more embodiments.

As shown in FIG. 3, the central monitoring station 500 may be comprised of several elements: central monitoring computing device 501, display 502, input device 503, and printer 505. The central monitoring computing device 501 maintains communication with all of the site's Truck Check Up stations 10 via either a wireless access point 507 or wired connection 512. The wireless antenna 504 is connected to the wireless access point 507. The wireless antenna can be mounted locally near the wireless access point 507 or it can be run to a remote location (roof or outside wall) to provide wider and better wireless coverage.

The display 502 and input device 503 are the primary mechanisms through which the vendor's attendant interacts with the central monitoring station 500, in one embodiment. The display 502 and input device 503 are both connected to the central monitoring computing device 501 either wired or wirelessly. The central monitoring computing device 501 may be connected to a printer 505 that provides a vehicle diagnostic report 506.

Figure 4:
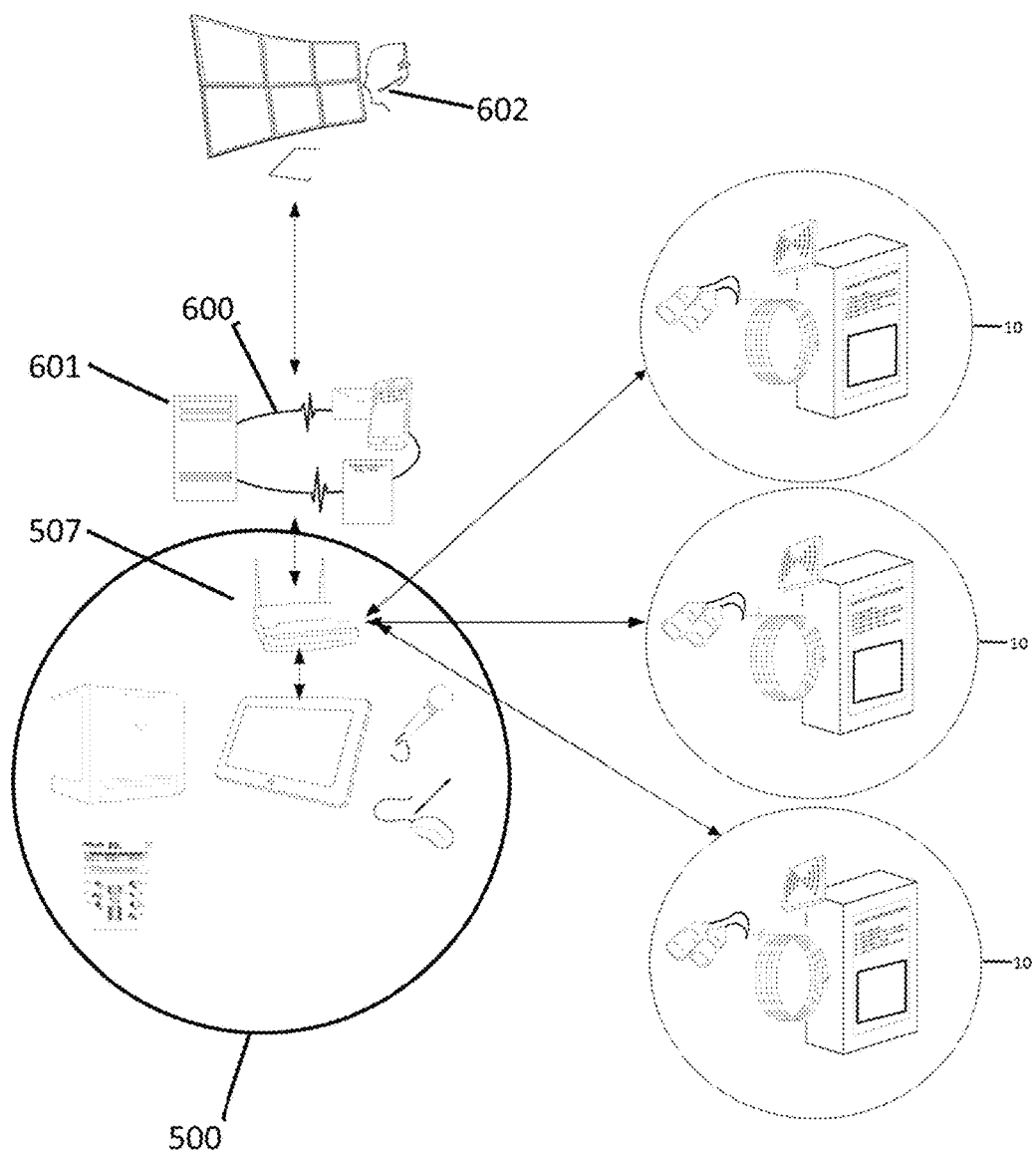
FIG. 4 presents a diagram showing the connectivity between the apparatuses and the central monitoring station and the Truck Check Up Server, according to one or more embodiments.
Figure 5:
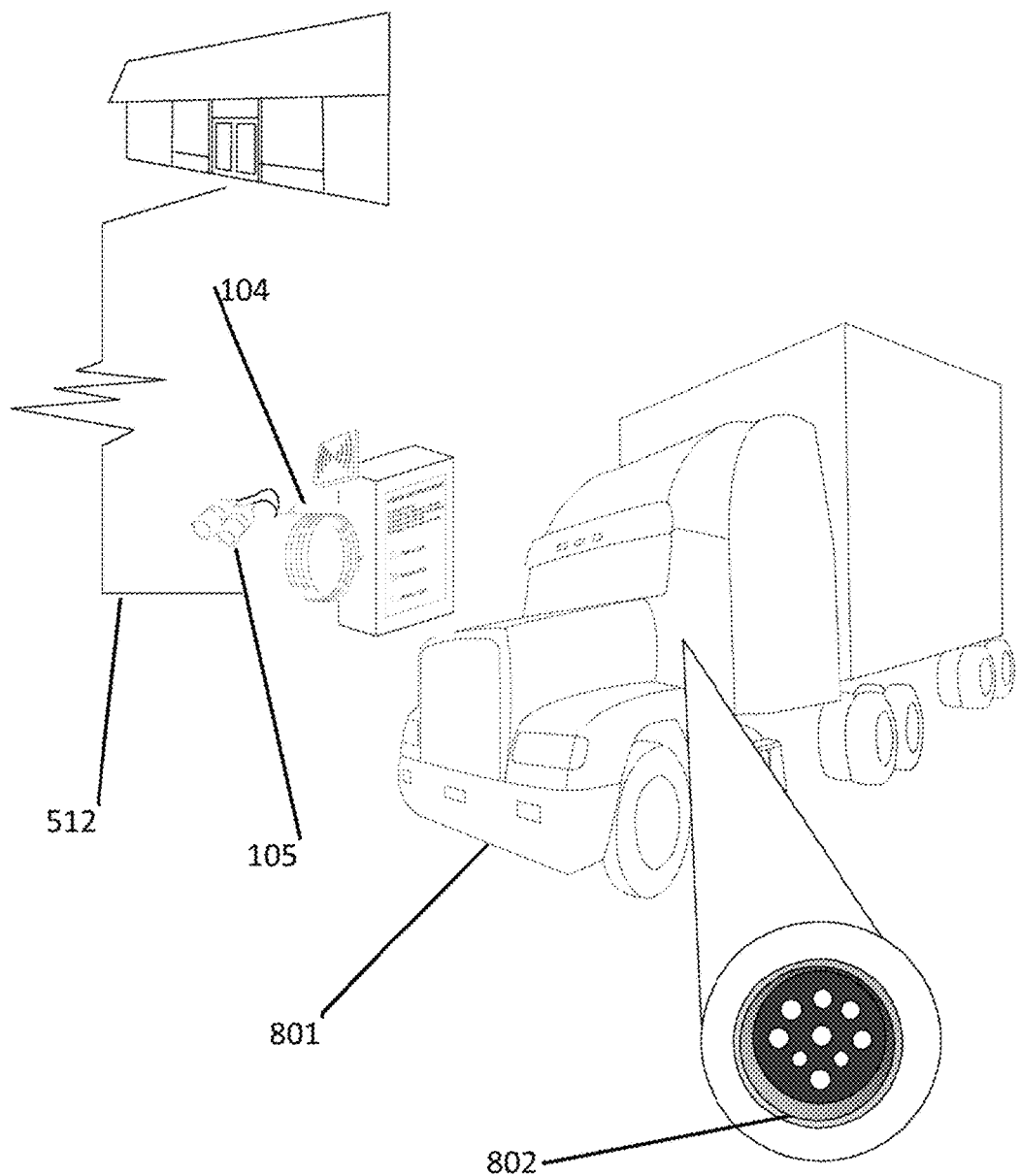
FIG. 5 presents a perspective view of a vehicle and its connection point, according to one or more embodiments.

FIG. 4 illustrates one option where the central monitoring station 500 can simultaneously monitor and interact with a plurality of apparatuses 10 installed on a vendor's site. Additionally the central monitoring station 500 can connect to all apparatus 10 using wireless or wired network communications. Using an external network 600, the central monitoring station 500 can connect to server 601. Based on the VIN or any other vehicle identity characteristics, the central monitoring station 500 can request any of the following, but not limited to, the vehicle history (prior interactions with TCU 10), predetermined email message(s), predetermined SMS and recall messages, service bulletins or service campaigns from the server 601. The central monitoring station 500 may upload communications logs to the server 601 allowing remote users 602, such as service centers or dispatchers, to help make an assessment of the vehicle's readiness.

To use the Truck Check Up station 10, a user drives the vehicle so that vehicle connector 105 can reach the vehicle (or so that the vehicle is in proximity of the wireless device of station 10). When the enclosure's proximity sensor 107 is activated, the computing device 301 wakes up, if asleep, and gets ready to perform a readiness assessment.

The user can connect the vehicle connector 105 via the retractable vehicle cable 104 to the vehicle 801 and its vehicle databus receptacle 802. Alternatively, a wireless connection can be made via a pairing process with the vehicle.

When the vehicle connector 105 is connected to the vehicle databus receptacle 802, when the vehicle is connected wirelessly, or optionally with some signal from the user to proceed, the apparatus 100 initially requests the VIN or other vehicle identity characteristic from the vehicle and the VIN is transmitted to the apparatus. The apparatus 100 may continue to communicate with the vehicle 801 and may communicate with one or more or every component on-board the vehicle.

For each component on the vehicle (e.g., each mechanical part of the vehicle which operates while the vehicle is in operation), the Truck Check Up station 10 extracts component identity characteristics of each component as well as various data points of each component. This may be done by sending a request to each component for information about the component. Each component may have separate systems which performs individual diagnostics only on such component and this diagnostic data may then be sent back to the apparatus 10 in response to the request from the apparatus 10. It is noted that the diagnostic operations for each component may happen in response to the request from the apparatus 10 or may be periodic and thus, but independent of the request from the apparatus 10.

Regardless, the apparatus 100 may take all the information that it extracts from the vehicle 801 and creates a data communications log 508. The data log 508 is transferred back to the central monitoring station 500, such as to the central monitoring computing device 501.

While the apparatus 100 is extracting the information, it may provide the user feedback via status indicators 103 on the apparatus enclosure 101. When the user arrives with the vehicle, the status indicators 103 denote the apparatus 100 is ready to connect. After connecting the apparatus 100 to the vehicle 801, the status indicators 103 change to reflect a positive connection. For the duration of the interaction between the vehicle 801 and apparatus 100, the status indicators 103 may provide feedback to the user.

Once the apparatus 100 has completed its communication with the vehicle 801, the apparatus 100 transfers the recorded communications log 508 to the central monitoring station 500 via a wireless or wired connection. Once on the central monitoring station 509 receives the log 508, the communications log 508 will be routed to the central monitoring computing device 501.

Once the apparatus 100 has completed its communication with both the vehicle and central monitoring station 500, the computing device 301 may check for any updates for its software. This check can be performed locally to the central monitoring station 500 or via central monitoring network 509 if it has access to the Truck Check Up Server 601. If an update is available, it will be downloaded and installed to the computing device 301.

At the central monitoring station 500, the arrival of communications log 508 initiates a series of steps: 1) the log 508 may be partially decoded to extract the vehicle's identity, 2) using the central monitoring network 509, the vehicle identity will be routed to the server 601, 3) based on the vehicle identity, the server 601 may return to the central monitoring station 500 one or more of the following items: vehicle history, vehicle and component recall and service campaigns, default email(s), and default SMS; 4) the central monitoring station 500 may upload communication logs 508 from a device 511 to the server 601 allowing remote users 602 such as service centers or dispatchers to help make an assessment of the vehicle's readiness; 5) once the file is uploaded, then the central monitoring station 500 sends a message to the apparatus that the truck diagnostics routine has completed.

When the transfer to central monitoring computing device 501 is complete, the apparatus 100 may wait for a return message from the central monitoring station 500 to complete the truck diagnostics. The apparatus 100 changes the status indicators 103 to denote that it is safe to disconnect the vehicle connector 105 from the vehicle databus receptacle 802. The apparatus 100 senses the vehicle disconnection (either wired or wireless) and changes the status indicators 103 to reflect such disconnection and that it is ready to connect to a new vehicle.

The user may then request the truck diagnostic report 506. A request is then sent to the central monitoring station 500 via the display 502 and any attached input devices 503. The interaction may comprise finding and selecting the communications log 508 that the user had previously recorded.

Once the communication log 508 is selected, the central monitoring computing device 501 decodes the log 508 and transforms the logged data into the diagnostic report 506.

Making an overall assessment of vehicle readiness is a multi-factor calculation. It combines the following factors using a weighted scale factor: 1) any component issues and the severity score of those issues. Severity score is based on impact on vehicle's performance and how urgently the issue should be dealt with; 2) any deficiency with any vehicle fluid or any other essential parameter and the severity of those deficiencies; 3) any active recall or service campaigns; 4) any outstanding emissions issues that could evolve into an engine derate. Each of these factors may be weighted in different schemes based on various factors. In applying the weighted scale factors, greater weight is given to data obtained directly from vehicle over external data sources.

The central monitoring computing device 501 may show a preview of the printed report on the connected display 502. Money may be collected for performing the diagnostics and/or delivering the diagnostic report 506 and sending the report to the connected printer 505. The report may also be sent to an electronic address instead of being printed.

The diagnostic report 506 may contains one or more of the following: Truck Check Up logo, name and address of vendor location where the diagnostics occur, vehicle summary (containing the overall vehicle readiness assessment), issues found on the vehicle along with the severity of each problem, scheduled maintenance reminders, any recalls or service campaigns related to the vehicle or its components, history of any previous Truck Check Up connections, and name and address of nearby service location and directions to it. Optionally the report may include the troubleshooting and service procedure for any or all of the issues found or any recommended maintenance based condition based analysis or predicted failure(s).

What is claimed is:

1. A vehicle roadworthiness assessment system comprising:
   a plurality of diagnostic apparatuses for performing diagnostic assessments on a plurality of trucks, each of the diagnostic apparatuses configured to connect to and request a status of components of one truck of the plurality of trucks, wherein the plurality of diagnostic apparatuses are installed at an onsite location of a vendor;
   a processor to determine, for a truck connected to one of the diagnostic apparatuses, a diagnostic assessment of any mechanical/electrical failures that affect operation of the truck thereby indicating whether the truck is operationally safe from a mechanical/electrical standpoint, wherein the diagnostic assessment includes a multi-factor calculation that weights at least two of the following factors: 1) any component issues, 2) any deficiency with a vehicle fluid or other essential parameter, 3) any active recall or service campaigns, and 4) any outstanding emissions issues that could evolve into an engine derate;
   a monitoring station connected to the plurality of diagnostic apparatuses to receive the diagnostic assessment for each truck where the diagnostic assessments were performed; and
   storage connected to the plurality of diagnostic apparatuses and configured to store data of the diagnostic assessments.

2. The device of claim 1 wherein the diagnostic apparatus reads data from the truck, the truck being equipped with a data bus connector, which allows for transmission of the status of the truck's components.

3. The device of claim 1 wherein each diagnostic apparatus is connected to a wireless network communication to transmit data to the monitoring station and the storage.

4. The device of claim 1 wherein each apparatus comprises a sensor for determining operating conditions comprising at least one of: customer proximity, truck proximity, humidity, and temperature at the apparatus.

5. The device of claim 1 wherein each apparatus comprises an interface adapter for connecting and communicating with a heavy duty truck.

6. The device of claim 5 wherein the adapter captures and records raw data from databuses of each truck.

7. The device of claim 1 wherein one or more of the apparatuses is configured to receive and output on a display advertising messages while in operation.

8. The device of claim 1 further comprising a cable to connect each apparatus to a respective truck.

9. The device of claim 8 wherein the cable comprises at least one of the following heads: SAE J1939-13 6 pin Deutsch connector, an SAE J1939-13 9 pin Deutsch connector, and an SAE J1962 connector.

10. The device of claim 1 wherein the truck comprises a driver portion and a trailer portion that the driver portion pulls, and wherein the diagnostic assessment obtains diagnostic data from both the driver portion and from the trailer portion.

11. A method to provide heavy duty trucks with a roadworthiness assessment, the method comprising:
    connecting a diagnostic apparatus to a truck, the truck comprising a plurality of components, whereby each of the plurality of components determines the status thereof and stores such information, wherein the diagnostic apparatus is installed at an onsite location of a vendor;

sending a request from the diagnostic apparatus to each of the plurality of components to request the information determined by each of the plurality of components;

receiving the information from each of the plurality of components in response to the request so as to determine a diagnostic assessment of any mechanical/electrical failures that affect operation of the truck thereby indicating whether the truck is operationally safe from a mechanical/electrical standpoint, wherein determining the truck's diagnostic assessment includes a multi-factor calculation that weights at least two of the following factors: 1) any component issues, 2) any deficiency with a vehicle fluid or other essential parameter, 3) any active recall or service campaigns, and 4) any outstanding emissions issues that could evolve into an engine derate; and outputting a diagnostic report for the truck.

12. The method of claim 11 further comprising suggesting operations to improve the performance or to repair the truck.

13. The method of claim 12 further comprising initiating the improvement or repair of the truck.

14. The method of claim 11 further comprising providing a time-stamp for each past connection made by a particular truck.

15. The method of claim 14 further comprising selecting a connection and printing a roadworthiness assessment associated with that connection for that truck.

16. The method of claim 11 wherein a network interface is made between a central monitoring station and a plurality of apparatus at a site.

17. The method of claim 11 wherein the diagnostic assessment is based upon severity of any truck faults and provides an indication of a level of severity, where severity level indicates the likelihood of mechanical/electrical failure of the truck.

18. The method of claim 11 further comprising transmitting the report over a network to a third party.

19. A vehicle roadworthiness assessment system comprising:

a diagnostic apparatus for performing a diagnostic assessment on a vehicle connected to the diagnostic apparatus, the diagnostic apparatus is configured to connect to and request a status of components of the vehicle, wherein the diagnostic apparatus is installed at an onsite location of a vendor;

a processor to determine the diagnostic assessment for the vehicle based on the diagnostic assessment, wherein the diagnostic assessment includes a multi-factor calculation that weights at least two of the following factors: 1) any component issues, 2) any deficiency with a vehicle fluid or other essential parameter, 3) any active recall or service campaigns, and 4) any outstanding emissions issues that could evolve into an engine derate;

a monitoring station connected to the diagnostic apparatus to receive the diagnostic assessment for the vehicle where the diagnostic assessment was performed, the diagnostic assessment for the vehicle indicating whether there are any mechanical/electrical failures that affect operation of the vehicle thereby indicating whether the vehicle is operationally safe from a mechanical/electrical standpoint; and storage connected to the diagnostic apparatus and configured to store data of the diagnostic assessment.

20. The vehicle roadworthiness assessment system of claim 19, wherein the processor weighs one or more components in determining a roadworthiness assessment score based on the diagnostic assessment.

* * * * *